Aug. 1, 1939.  L. C. HEIDINGER  2,168,065

RAT TRAP

Filed Nov. 14, 1938

INVENTOR
LOUIS C. HEIDINGER,
BY *H. M. Plaisted,*
ATTORNEY.

Patented Aug. 1, 1939

2,168,065

UNITED STATES PATENT OFFICE 2,168,065

RAT TRAP

Louis C. Heidinger, Belleville, Ill.

Application November 14, 1938, Serial No. 240,315

1 Claim. (Cl. 43—69)

This invention relates to certain new and useful improvements in rat traps, the peculiarities of which will be hereinafter fully described and claimed.

More specifically, this invention relates to traps that set themselves again after the passage of the animal thereinto, so that the next rat and others in succession, may be caught in the same trap.

The main objects of my invention are to provide means first, for a central trap adapted to lure a rat into a position over tilting lids so that he will drop stern first into said box in his endeavor to reach the bait; second, to locate a suitable bait box above tilting lids in a trap, to induce a rat to assume a position favorable to his being dropped into said trap; third, to guard against the escape of a rat that has been previously caught when another rat enters the trap; fourth, to provide suitable jail boxes communicating with the central trap, so that rats may be caused to leave the central box clear for use as a trap and enter the communicating compartments: and other parts of construction hereinafter pointed out and claimed.

Figure 1:
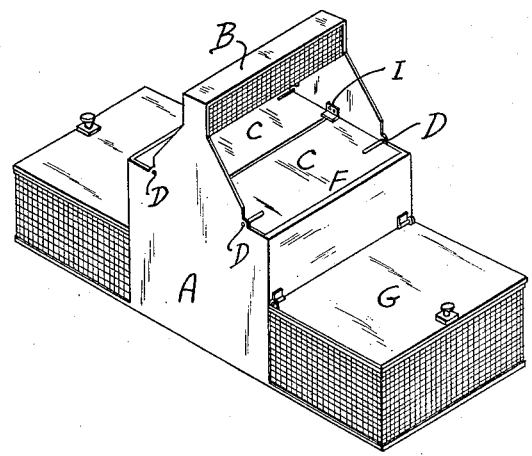
Figure 2:
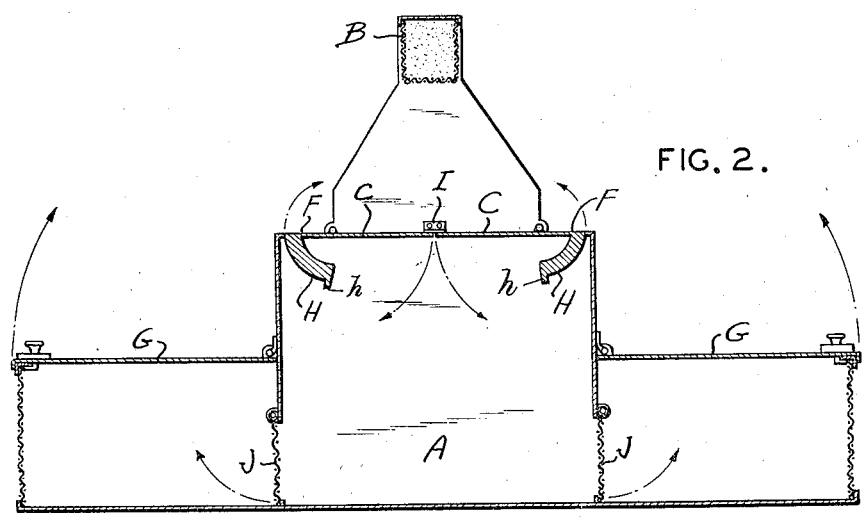

In the accompanying drawing in which like reference characters indicate corresponding parts, Fig. 1 shows an isometric view of a rat trap exemplifying my improvements;

Fig. 2, a central vertical section lengthwise of Fig. 1; and

Figure 3:
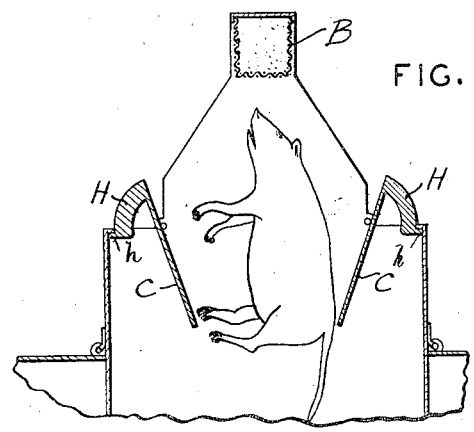

Fig. 3, a fragmentary view similar to Fig. 2 showing the way a rat is caused to enter my trap.

Referring to the drawing the letter A indicates a central or main box adapted to serve as a trap. The sides of said box are extended upward and support a bait box B, having a bait enclosed in a reticulated covering that will lure a rat to stand on his hind legs upon a pair of pivoted lids C—C forming the top of box A. These lids are pivoted at D at a point in each end of the lid that is about two-thirds nearer the outer edge than the closely adjacent inner edges.

At each end of the main or center box, is a smaller compartment G communicating with the center box by a swinging screen gate J which will swing outward under pressure of a rat seeking to leave the central box, but will not swing inward after passage of the rat therethrough. The rats are therefore held in the compartments G—G, the sides of which have reticulated wire and are lighted thereby, while the central box is dark. The rats naturally, therefore, seek to enter the side boxes G from the dark trap box A.

The pair of lids forming the top of the trap box are counterbalanced so as to automatically assume a horizontal position after being tilted under the weight of a rat who is standing on his hind legs in an endeavor to reach the bait box. Fig. 3 shows the way he is dumped into the trap box by the tilting of the lids, which are guarded at their outer edges by a counterbalanced weight H on each lid. This weight is heavy enough to bring the lids back to normal horizontal position after being tilted, but will not prevent a rat who is standing on the inner edges or near them from descending into the trap box as indicated in Fig. 3.

The end of the counterbalance H on each lid has a lip $h$ that engages a portion of the trap box to prevent the outer end of the lid from swinging too far towards the center while being tilted. Any other means for limiting the tilting of the lids may be used.

When the lids are brought up to a horizontal position again, they engage a stop I, or otherwise are limited in their swinging motion about the pivots D.

The counterbalance H on each lid practically closes the opening formed when the outer edge of the lid rises as shown in Fig. 3. Thus a rat previously caught but not yet entering a jail box, cannot suddenly jump out of the trap box when the lids are being tilted. This guarding function of the curved strip H is in addition to its function as a counterbalance for its lid to which it is attached on the under side of the outer edge as shown in Figs. 2 and 3.

The jail boxes being smaller than the trap box, allows a rat to use either jail box as a step from which to jump on the top of the trap box. When he alights on the outer edge F of a lid and sees the bait, he naturally moves forward and passes the line of the pivots D—D and rises on his hind legs to reach up for the overhead bait box. In this position his weight causes the inner edges of the lids to tilt downward and he assumes the position indicated in Fig. 3; from this position he is not able to spring upward and is therefore deposited in the trap box.

In actual operation of such a rat trap, I have caught as many as six rats in a night, as the self-setting tilting lids and overhead bait are restored to their original position ready for succeeding rats by the construction above described.

This device may be made out of wood alined with sheet metal, but is preferably made entirely of sheet metal and reticulated wire to form the construction illustrated.

Referring again to the drawing, the tops G of the side boxes are hinged and held by a turn bolt in their closed position, so that the bodies of the rats in the jail compartments may be readily removed after being drowned or otherwise killed.

The lower end of the curved strip H is turned outward at $h$ as shown, or otherwise adapted to engage the boxes and serve as a stop to prevent the lids from swinging beyond the nearly vertical position shown in Fig. 3. As previously stated the lids have any suitable stop for their return to a horizontal position and the above described projection $h$ from the curved strip engaging a portion of the box serves as a stop for the lids in their tilted position as above described. The strip H curved about its pivot, closes the opening between the outer edge of the respective lid and the adjacent portion of the box and thus guards the opening otherwise formed through which a rat previously caught in the trap box might attempt to escape.

I do not limit myself to the exact construction shown except by the appended claim.

I claim:

A rat trap having, in combination a bait box centrally mounted above a trap box having a top consisting of a pair of lids having their inner edges closely adjacent and pivotally supported horizontally approximately two-thirds the distance from their inner edges, the outer edges being provided with weights curved in a quadrant about their pivots and each characterized by having a projecting lip adapted to engage a portion of the trap box to limit the tilted swing of the lid, and a stop for the lids when returned to their horizontal position.

LOUIS C. HEIDINGER.